US011368719B2

(12) United States Patent
Oh et al.

(10) Patent No.: US 11,368,719 B2
(45) Date of Patent: Jun. 21, 2022

(54) METHOD AND DEVICE FOR ENCODING THREE-DIMENSIONAL IMAGE, AND METHOD AND DEVICE FOR DECODING THREE-DIMENSIONAL IMAGE

(71) Applicant: Samsung Electronics Co., Ltd., Suwon-si (KR)

(72) Inventors: Youngho Oh, Suwon-si (KR); Jihwan Woo, Suwon-si (KR); Sungryeul Rhyu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/258,963

(22) PCT Filed: Jul. 11, 2019

(86) PCT No.: PCT/KR2019/008570
§ 371 (c)(1),
(2) Date: Jan. 8, 2021

(87) PCT Pub. No.: WO2020/013631
PCT Pub. Date: Jan. 16, 2020

(65) Prior Publication Data
US 2021/0136414 A1 May 6, 2021

(30) Foreign Application Priority Data
Jul. 12, 2018 (KR) .................. 10-2018-0081326

(51) Int. Cl.
*H04N 19/00* (2014.01)
*H04N 19/597* (2014.01)
(Continued)

(52) U.S. Cl.
CPC .......... *H04N 19/597* (2014.11); *H04N 19/44* (2014.11); *H04N 19/94* (2014.11); *H04N 19/543* (2014.11);
(Continued)

(58) Field of Classification Search
CPC ...... H04N 19/597; H04N 19/44; H04N 19/94; H04N 19/42; G06T 3/0031; G06T 2207/1002
See application file for complete search history.

(56) References Cited

U.S. PATENT DOCUMENTS 9,177,414 B2 11/2015 Park et al.
10,591,185 B1* 3/2020 Des Champs .......... F24H 8/006
(Continued)

FOREIGN PATENT DOCUMENTS

KR 10-2013-0026853 A 3/2013

OTHER PUBLICATIONS

Hoppe et al, ("Surface reconstruction from unorganized points," in Proc. SIGGRAPH, 1992.*
(Continued)

*Primary Examiner* — Frank F Huang
(74) *Attorney, Agent, or Firm* — Jefferson IP Law, LLP

(57) ABSTRACT

A method of encoding a three-dimensional (3D) image including a point cloud includes grouping a plurality of points included in the point cloud into at least one segment; generating patches by projecting the points included in the segment onto a predetermined plane in a first direction or a second direction; generating two-dimensional (2D) images by packing the patches; and generating and outputting a bitstream including information about a direction in which each point is projected to generate the patches and information about the 2D images.

14 Claims, 9 Drawing Sheets

(51) Int. Cl.
*H04N 19/44* (2014.01)
*H04N 19/94* (2014.01)
*H04N 19/557* (2014.01)
*H04N 19/65* (2014.01)
*H04N 19/543* (2014.01)
*H04N 19/68* (2014.01)
*H04N 19/553* (2014.01)
*H04N 19/583* (2014.01)
*H04N 19/563* (2014.01)

(52) U.S. Cl.
CPC .......... *H04N 19/553* (2014.11); *H04N 19/557* (2014.11); *H04N 19/563* (2014.11); *H04N 19/583* (2014.11); *H04N 19/65* (2014.11); *H04N 19/68* (2014.11)

(56) References Cited

U.S. PATENT DOCUMENTS

| | | | |
|---|---|---|---|
| 10,605,480 B1* | 3/2020 | Des Champs | F16T 1/22 |
| 11,060,786 B1* | 7/2021 | Des Champs | F24F 13/22 |
| 2009/0175407 A1* | 7/2009 | Harer | G01N 23/046 378/20 |
| 2011/0010400 A1 | 1/2011 | Hayes | |
| 2016/0132716 A1* | 5/2016 | Cheng | G06K 9/00201 382/103 |
| 2016/0259052 A1* | 9/2016 | Kirmani | G01S 7/6245 |
| 2016/0367336 A1* | 12/2016 | Lv | A61C 1/082 |
| 2017/0024874 A1* | 1/2017 | Pang | G06K 9/00771 |
| 2019/0226715 A1* | 7/2019 | Des Champs | F16T 1/22 |
| 2020/0179051 A1* | 6/2020 | Miga | G16H 30/00 |
| 2020/0258300 A1* | 8/2020 | Schwarz | G06T 17/20 |

OTHER PUBLICATIONS

3DG, Khaled Mammou, 'PCC Test Model Category 2 v0', International Organisation for Standardisation ISO/IEC JTC1/SC29/WG11 Coding of Moving Picture and Audio, N17248, Macau, China, Oct. 31, 2017.

He et al., 'Best-Effort Projection Based Attribute Compression for 3D Point Cloud', IEEE, 2017 23rd Asia-Pacific Conference on Communications (APCC), Dec. 13, 2017.

Tulvan et al., 'Use Cases for Point Cloud Compression (PCC)', International Organisation for Standardisation ISO/IEC JTC1/SC29/WG11 Coding of Moving Picture and Audio, N16331, Geneva, CH, Jun. 30, 2016.

3DG, Khaled Mammou, 'PCC Test Model Category 2 v1', International Organisation for Standardisation ISO/IEC JTC1/SC29/WG11 Coding of Moving Picture and Audio, N17348, Gwangju, Republic of Korea, Jan. 2018.

Sony corporation, Kuma et al., 'PCC TMC2 with additional projection plane', International Organisation for Standardisation ISO/IEC JTC1/SC29/WG11 Coding of Moving Picture and Audio, m43494, Ljubljana, SI, Jul. 2018.

Samsung Electronics, Oh et al., '[V-PCC] Enhanced algorithm for the selection of projection plane', International Organisation for Standardisation ISO/IEC JTC1/SC29/WG11 Coding of Moving Picture and Audio, m46457, Marrakesh, Morocco, Jan. 2019.

Samsung Electronics, Rhyu et al., '[PCC] TMC2 Projection directions from bounding box', International Organisation for Standardisation ISO/IEC JTC1/SC29/WG11 Coding of Moving Picture and Audio, M43669, Ljubljana, SI, Jul. 2018.

International Search Report dated Oct. 18, 2019, issued in International Patent Application No. PCT/KR2019/008570.

Extended European Search Report dated Feb. 8, 2021, issued in European Patent Application No. 19834729.6.

* cited by examiner d(k): depth of point k
p[i]: location on 2D projection plane (flattened index i)

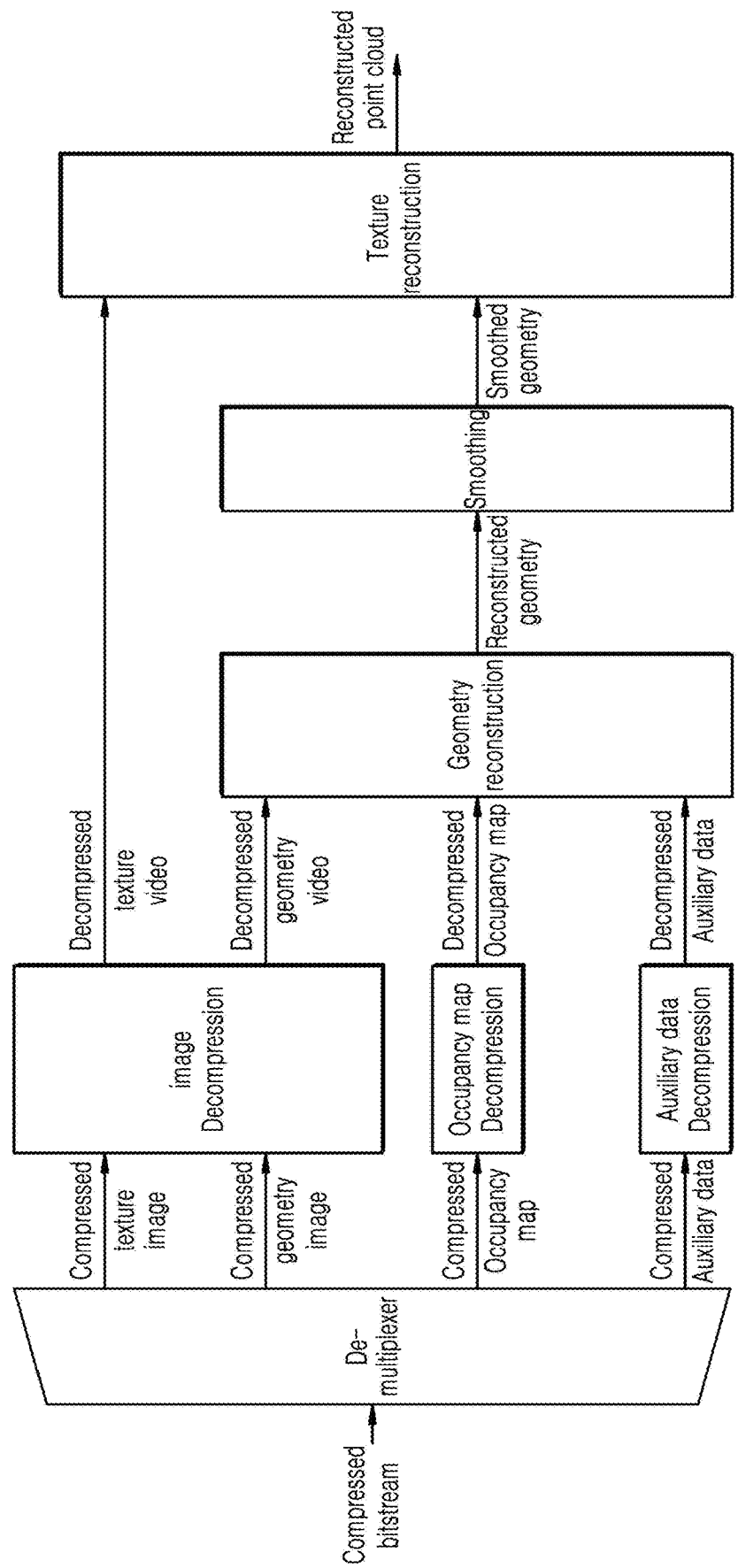

METHOD AND DEVICE FOR ENCODING THREE-DIMENSIONAL IMAGE, AND METHOD AND DEVICE FOR DECODING THREE-DIMENSIONAL IMAGE

TECHNICAL FIELD

The present disclosure relates to a method and apparatus for processing three-dimensional (3D) data. In detail, the present disclosure relates to a method and apparatus for encoding a 3D image, and a method and apparatus for decoding a 3D image.

BACKGROUND ART

A point cloud, which is a method of expressing three-dimensional (3D) data, refers to a group of an enormous number of points, and large-capacity 3D data may be expressed with a point cloud. To express the points within a 3D space, the point cloud may have a vector shape including location coordinates and color information of each of the points. For example, the point cloud may be expressed as (x, y, z, R, G, B). A point cloud, which forms a spatial configuration by collecting numerous colors and location data becomes more detailed data as a density increases, and has a meaning as a single 3D model.

Because a point cloud that expresses 3D data occupies large numbers of memories and processor resources, a technique of compressing the point cloud is required to transmit the point cloud. Accordingly, such a method of efficiently compressing 3D data is required. Furthermore, a method of processing efficiently-compressed 3D data is required.

DESCRIPTION OF EMBODIMENTS

Technical Problem

The present disclosure provides a method and apparatus for efficiently processing three-dimensional (3D) data. In detail, the present disclosure provides a method and apparatus for efficiently compressing 3D data, and a method and apparatus for reconstructing a 3D image by processing compressed and transmitted 3D data.

Technical Solution to Problem

According to an aspect of the present disclosure, a method of processing and transmitting three-dimensional (3D) data expressed with a point cloud includes estimating a normal vector of each of points included in the point cloud, projecting grouped points, based on the estimated normal vector; generating a two-dimensional (2D) image by packing a projected patch, and encoding and transmitting the generated 2D image.

According to another aspect of the present disclosure, a method of encoding a 3D image including a point cloud includes grouping a plurality of points included in the point cloud into at least one segment, generating patches by projecting the points included in the segment onto a predetermined plane in a first direction or a second direction, generating 2D images by packing the patches, and generating and outputting a bitstream including information about a direction in which each point is projected to generate the patches and information about the 2D images.

According to another aspect of the present disclosure, an image encoding apparatus includes at least one processor configured to group a plurality of points included in a point cloud into at least one segment, generate patches by projecting the points included in the segment onto a predetermined plane in a first direction or a second direction, and generate 2D images by packing the patches, and an output interface configured to generate and output a bitstream including information about a direction in which each point is projected to generate the patches and information about the 2D images.

According to another aspect of the present disclosure, a 3D image decoding method includes receiving a bitstream, obtaining a texture image, a geometry image, and projection direction information from the bitstream, reconstructing location information of points, based on the geometry image and the projection direction information, and reconstructing the point cloud by reconstructing color information of points of which location information has been reconstructed, based on the texture image, wherein the projection direction information includes information about a direction in which the points included in the point cloud have been projected onto a predetermined plane from among a first direction and a second direction, to generate the geometry image.

According to another aspect of the present disclosure, a 3D image decoding apparatus includes a receiver configured to receive a bitstream, and at least one processor configured to reconstruct the point cloud by obtaining a texture image, a geometry image, and projection direction information from the bitstream, reconstructing location information of points, based on the geometry image and the projection direction information, and reconstructing color information of points of which location information has been reconstructed. The projection direction information includes information about a direction in which the points included in the point cloud have been projected onto a predetermined plane from among a first direction and a second direction, to generate the geometry image.

Advantageous Effects of Disclosure

According to the present disclosure, the amount of data transmission may be reduced through efficient compression and transmission of three-dimensional (3D) data. Thus, resources such as a storage space, a transmission time period, and hardware costs may be saved. According to the present disclosure, a 3D image may be reconstructed by processing efficiently-compressed and transmitted data.

However, effects attainable by the present disclosure are not limited to the aforementioned effects, and other effects not mentioned above will be clearly understood by one of ordinary skill in the art from the description below,

BRIEF DESCRIPTION OF DRAWINGS

FIG. 11 is a block diagram of a detailed structure of a processor of an image decoding apparatus according to an embodiment.

BEST MODE

Figure 1:
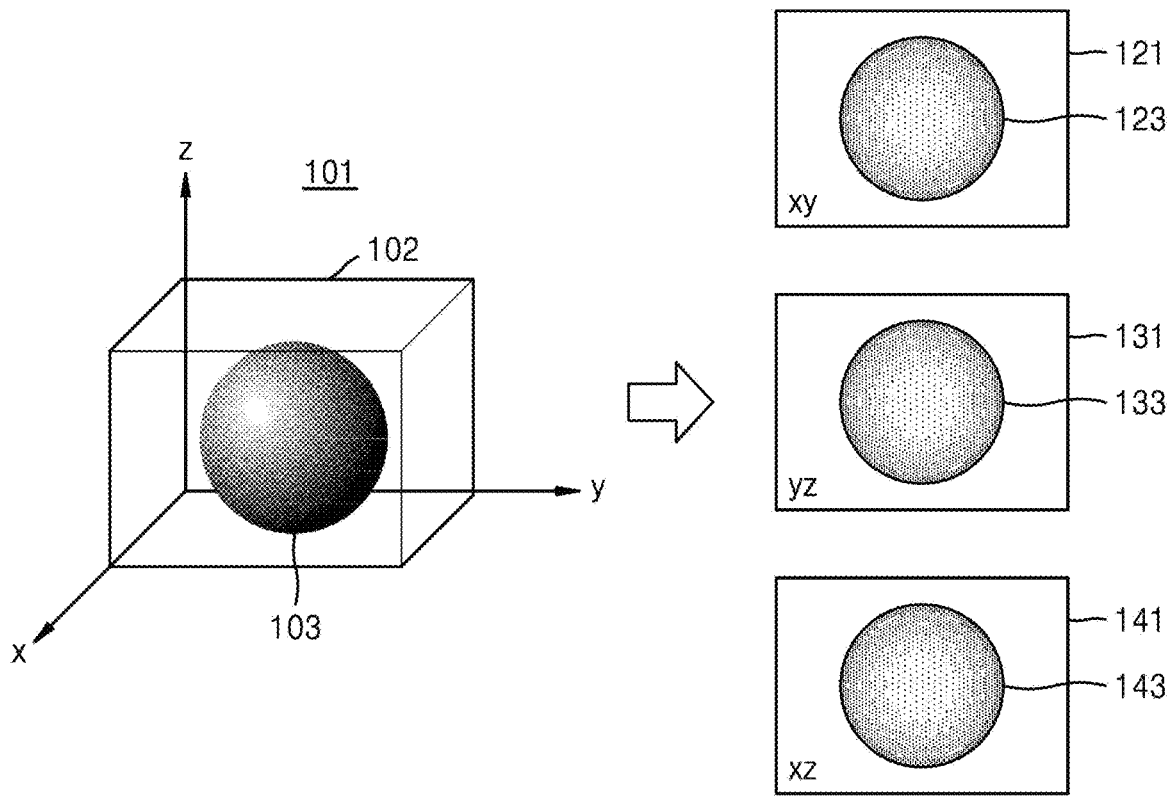
FIG. 1 is a diagram for describing a general processing method for transmitting a three-dimensional (3D) image expressed with a point cloud.

A method of processing and transmitting three-dimensional (3D) data expressed with a point cloud, according to an embodiment of the present disclosure, includes estimating a normal vector of each of points included in the point cloud, projecting grouped points, based on the estimated normal vector, generating a two-dimensional (2D) image by packing a projected patch, and encoding and transmitting the generated 2D image.

MODE OF DISCLOSURE

Embodiments of the disclosure are described in detail herein with reference to the accompanying drawings so that this disclosure may be easily performed by one of ordinary skill in the art to which the disclosure pertains. The disclosure may, however, be embodied in many different forms and should not be construed as being limited to the embodiments set forth herein. In the drawings, parts irrelevant to the description are omitted for simplicity of explanation, and like numbers refer to like elements throughout.

The aforementioned embodiments may be described in terms of functional block components and various processing steps. Some or all of such functional blocks may be realized by any number of hardware and/or software components configured to perform the specified functions. For example, functional blocks according to the disclosure may be realized by one or more microprocessors or by circuit components for a predetermined function. In addition, for example, functional blocks according to the disclosure may be implemented with any programming or scripting language. The functional blocks may be implemented in algorithms that are executed on one or more processors. Furthermore, the disclosure described herein cloud employ any number of conventional techniques for electronics configuration, signal processing and/or control, data processing and the like.

Furthermore, the connecting lines or connectors between components shown in the various figures presented are intended to represent exemplary functional relationships and/or physical or logical couplings between the components. Connections between components may be represented by many alternative or additional functional relationships, physical connections or logical connections in a practical device.

In the present specification, "image" may include all of a still image, a moving picture, a video frame, and/or a video stream, and may include both a two-dimensional (2D) frame and a three-dimensional (3D) frame. For example, "image" may include a 3D frame that is expressed as a point cloud.

The term "image" used throughout this specification refers not only to the term "image" itself, but also is used as a generic term to describe various types of image information that may be known in the related field such as "picture", "frame", "field" or "slice". For example, "image" may refer to one of a plurality of pictures or a plurality of frames constituting a video stream, or may refer to the entire video stream including a plurality of pictures or a plurality of frames.

In this specification, for convenience of description, an apparatus for encoding an image and an apparatus for decoding an image have been described separately, but each of the image encoding apparatus and the image decoding apparatus may refer to an electronic device such as a user terminal (user equipment (UE)).

The user terminal may be at least one of a personal computer (PC), a cellular phone, a smartphone, a TV, a tablet, a notebook, personal digital assistants (PDAs), a portable multimedia player (PMP), a navigation device, an MP3 player, a digital camera, a black box, a device mounted on automobiles, a module within a device mounted on automobiles, or an automobile. Of course, the user terminal is not limited to the above example, and may include various electronic devices.

The disclosure will now be described more fully with reference to the accompanying drawings, in which exemplary embodiments are shown.

A 2D image may be expressed as a group of pixels having color values. A 3D image may be expressed as a group of voxels having color values. Image data expressed as a group of points (or voxels) having color values within a 3D space is referred to as a point cloud. Because the point cloud contains information on the 3D space, the point cloud is composed of vectors of a dimension one level higher than the dimension of a 2D image, and has a larger amount of data than the 2D image. Therefore, high-efficient compression technology is needed to provide the point cloud to users quickly, accurately, and efficiently.

FIG. 1 is a diagram for describing a general processing method for transmitting a 3D image expressed with a point cloud.

FIG. 1 illustrates a virtual 3D space 101 including an object 103 represented by a point cloud. In point cloud compression technology according to an embodiment, points representing the object 103 may be projected onto each of a xy plane, a yz plane, and a xz plane of a virtual rectangular cuboid 102 surrounding the object 103. In general, a direction in which points are projected may be one direction perpendicular to a predetermined plane. For example, the points may be projected onto the xy plane in a −z axis direction, may be projected onto the yz plane in a −x axis direction, or may be projected onto the xz plane in a −y axis direction.

An image 121 may be generated by projecting the points representing the object 103 onto the xy plane. Information about a distance (hereinafter, referred to as a depth) between the xy plane and a point closest to the xy plane from among the points projected onto the same location on the xy plane may be recorded within the image 121. In other words, a circle 123 within the image 121 may represent information about depths of points close to the xy plane, which is a projection plane, from among the points included in the sphere 103. For example, as the brightness of a pixel included in the circle 123 increases, a depth value from the xy plane may decrease.

In the same manner, images 131 and 141 may be generated by projecting the points representing the object 103 on the yz plane and the xz plane, respectively. Circles 133 and 143 within the images 131 and 141 may represent information about depths of points close to the yz plane and the xz plane, from among the points included in the sphere 103. For example, as the brightnesses of pixels included in the circles 133 and 143 increase, a depth value from the projection plane may decrease.

As shown in FIG. 1, an image encoding apparatus according to an embodiment may transform a point cloud into a 2D image and may compress the 2D image by using existing image compression technology, thereby compressing a large-capacity point cloud with a very high compression rate. An image decoding apparatus according to an embodiment may reconstruct the point cloud from the compressed 2D image.

The image decoding apparatus according to an embodiment may store not only information about points closest to a projection plane but also information about points within a certain thickness value with respect to a direction opposite to a projection direction. To store the information about points within the certain thickness value with respect to the direction opposite to the projection direction, the image decoding apparatus may store information of a farthest point from among the points existing within a certain thickness value from among the points closest to the projection plane.

Figure 2:
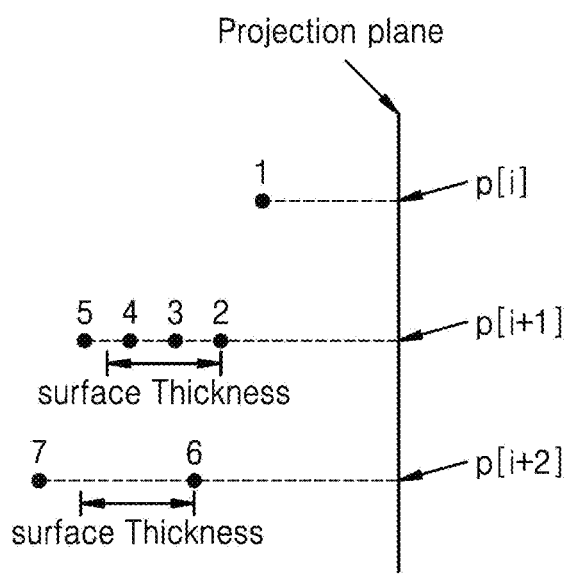
FIG. 2 is a diagram illustrating a method of storing 3D data of the inside of an object in two-dimensional (2D) data by using a surface thickness value.

FIG. 2 is a diagram illustrating a method, performed by the image encoding apparatus according to an embodiment, of storing 3D data of the inside of an object in 2D data by using a surface thickness value. The surface thickness value may be a pre-determined value.

FIG. 2 illustrates a case where a point cloud including a segment composed of points 1, 2, 3, 4, 5, 6, and 7 is projected onto a projection plane. A patch may be a unit in which a plurality of points included in the point cloud are grouped.

According to an embodiment, the image encoding apparatus may project points closest to a projection plane onto the projection plane, and may store only information about the projected points on the 2D image.

For example, the image encoding apparatus may project the point 1, the point 2, and the point 6 closest to the projection plane onto the projection plane. The image encoding apparatus may store only a depth value related to the point 2 within a projected image, and may not store information about the points 3, 4, and 5 projected to a point p[i+1] to which the point 2 has been projected.

An image encoding apparatus according to another embodiment may arbitrarily set a surface thickness value, and may process only depth values of the points existing within the surface thickness value. The image encoding apparatus may store only a first depth value D0 of a point closest to a projection plane, and a second depth value D1 of a point having a largest depth value within the preset surface thickness value, and may not store a depth value of an in-between point existing between the two points. The image encoding apparatus may store color information of the point associated with the first depth value D0 as a T0 value, and may store color information of the point associated with the second depth value D1 as a T1 value.

For example, the image encoding apparatus may project the point 1, the point 2, and the point 6 closest to the projection plane, and project the point 4 located within the surface thickness from the point 1. With regard to a point p[i+1], the image encoding apparatus may store, as the D0 value, a depth value d(2) of the point 2 closest to the projection plane, may store, as the D1 value, a depth value d(4) of the point 4 having a largest depth value within the preset surface thickness value, and may not store a depth value of the point 3 existing between the points 2 and 4.

With regard to a point p[i], the image encoding apparatus may store, as the D0 and D1 values, a depth value d(1) of the point 1 closest to the projection plane. With regard to a point p[i+2], the image encoding apparatus may store, as the D0 and D1 values, a depth value d(6) of the point 6 closest to the projection plane.

In this case, all of the points included in a patch may not be projected together. Some of the points included in the patch may be parsed out based on depth constraints of each patch.

The depth constraints may include the following constraints.

A maximum value of a depth range variation for each block needs to be less than 32. (i.e., depth_of_point-min_depth_in_block<32)

A maximum depth of each path needs to be less than 255. These constraints secure that a depth map may be encoded using 8 bits.

When the depth of a point within a patch does not satisfy the above depth constraints, the point may not be projected together with the other points within the patch. The point may be included in another connection component (namely, another patch) through a future iteration.

After performing the projection process described above with reference to FIGS. 1 and 2, the image encoding apparatus according to an embodiment may generate a 2D image by collecting groups of projected points. At this time, the image encoding apparatus may generate a D0 image by collecting D0 values, generate a D1 image by collecting D1 values, generate a T0 image by collecting T0 values representing color information of a point associated with D0, and generate a T1 image by collecting T1 values representing color information of a point associated with D1.

At this time, as shown in FIG. 1, according to a method of performing projection onto a predetermined plane in one direction, the D0 image may include both information about a point located on an outer surface of an object (hereinafter, referred to as an outer surface point) and information about a point located inside a surface (hereinafter, an inner point), and the D1 image may include both information about the outer surface point and information about the inner point. Accordingly, the T0 image and the T1 image may include both color information about the outer surface point and color information about the inner point.

Figure 3:
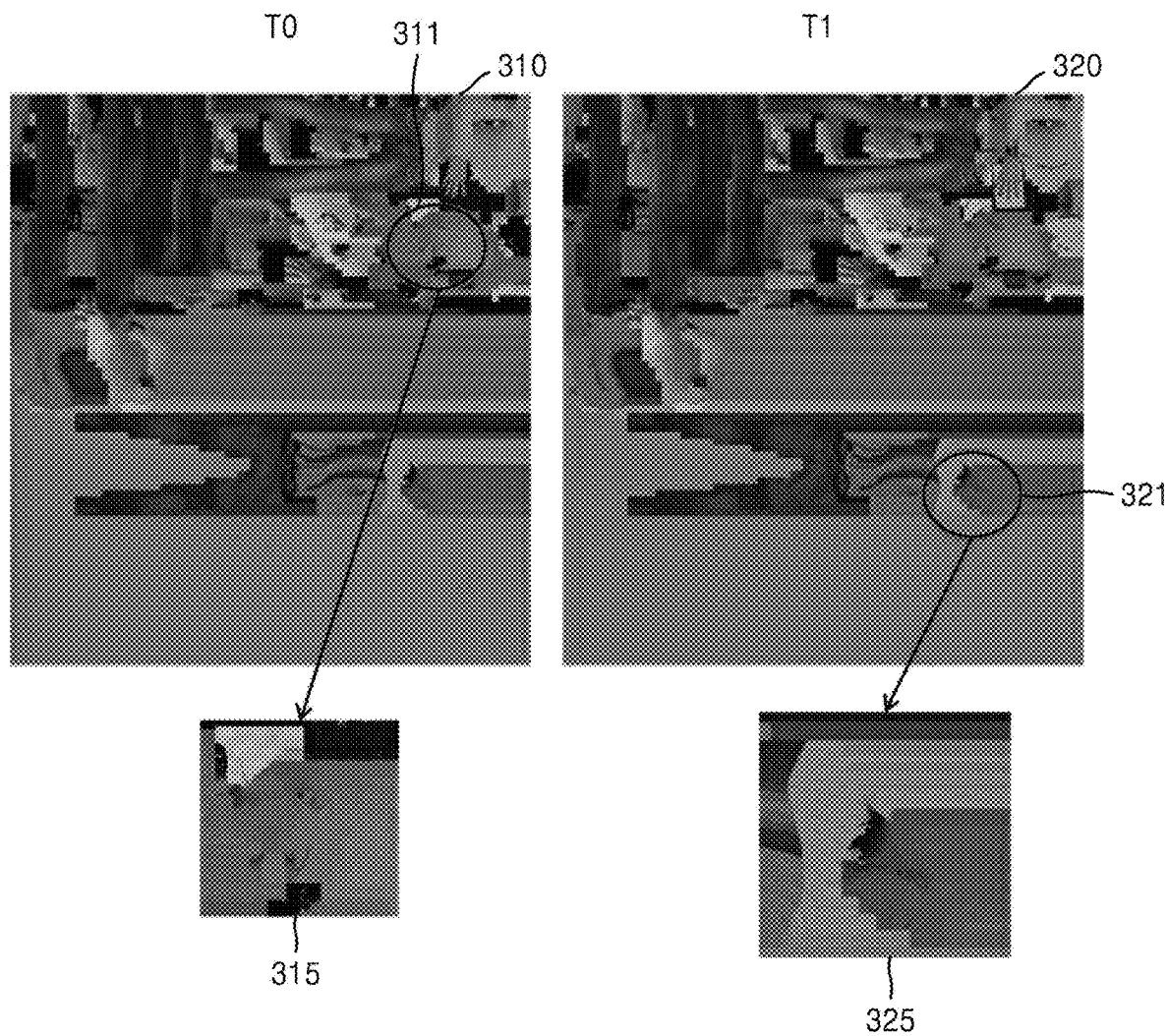
FIG. 3 illustrates a T0 image and a T1 image generated by projecting a point cloud onto a 2D plane.

FIG. 3 illustrates a T0 image 310 and a T1 image 320 generated by projecting a point cloud indicating a human wearing red earrings on his or her ears onto a 2D plane in one direction. In this case, the earrings are expressed by a point located on the outer surface of an object that is the person.

A result of projecting the point cloud in one direction may show that a right red earring 311 is included in the T0 image and a left red earring 321 is included in the T1 image. An image 315 is obtained by magnifying an image representing the right red earring 311. An image 325 is obtained by magnifying an image representing the left red earring 321. As shown in FIG. 3, when the point cloud is projected onto the 2D plane in one direction, information about an outer surface point and information about an inner point are mixed within the T0 image and the T1 image.

When color information about the outer surface point and color information about the inner point (located a predetermined thickness inside from the outer surface) are different from each other, connection between patch groups that constitute the T0 image and the T1 image may degrade. Accordingly, when an image including the patch groups between which connection is degraded is compressed using a 2D image compression codec, compression performance may degrade.

In the case of a point cloud having a hollow shape, an externally exposed surface may be relatively very important, whereas an internally hidden surface may be less important. However, when outer surface point information and inner point information are mixed within an identical image (for example, the T0 image or the T1 image), it is difficult to determine which one of the two images is more import or less important.

Thus, the image encoding apparatus according to an embodiment may project each patch of a point cloud from outside to inside such that information about the outer surface point of the point cloud and color information about the inner point thereof may be separately stored.

A structure and operation of an image encoding apparatus 400 according to an embodiment will now be described with reference to FIG. 4. The image encoding apparatus 400 according to an embodiment may encode received image data. For example, the image encoding apparatus 400 may be connected to an image decoding apparatus through a network, and may transmit compressed and encoded image data to the image decoding apparatus.

The image encoding apparatus 400 may include a processor 410 and an output interface 420. Although the image encoding apparatus 400 includes the single processor 410 in FIG. 4, the image encoding apparatus 400 may include a plurality of processors, and a function and an operation of the processor 410, which will be described below, may be performed by the plurality of processors.

Figure 4:
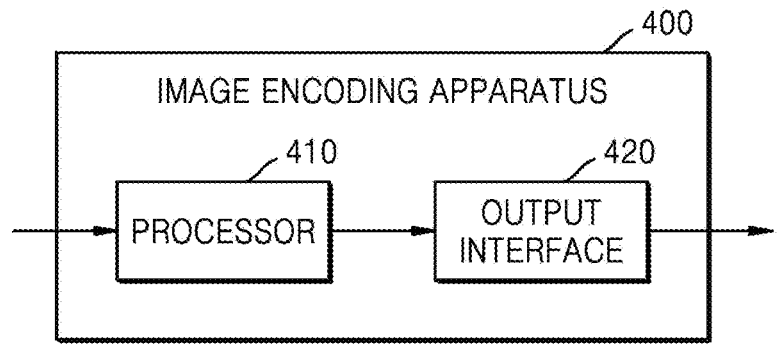
FIG. 4 is a block diagram of an image encoding apparatus according to an embodiment.

Although not shown in FIG. 4, the image encoding apparatus 400 may further include a memory. The entirety or a portion of data about a point cloud processed by the image encoding apparatus 400 may be temporarily or semi-permanently stored in the memory. The entirety or a portion of an algorithm about image processing methods performed by the image encoding apparatus 400 may be temporarily or semi-permanently stored in the memory. However, the memory, the processor 410, and the output interface 420 do not necessarily have to be implemented as separate devices, but may be implemented as a single component having the same form as a single chip.

The image encoding apparatus 400 may obtain 3D image data and may process the 3D image data by using the processor 410. The 3D image data may include point cloud data representing an object on a virtual 3D space. A process, performed by the processor 410 according to an embodiment, of processing the 3D image data will now be described in more detail.

The processor 410 according to an embodiment may estimate a normal vector for each of a plurality of points included in a point cloud. The normal vector of each point may be estimated for a plane formed by the point and adjacent points within a certain area.

The processor 410 according to an embodiment may group the plurality of points included in the point cloud into at least one segment.

The processor 410 may group the plurality of points into at least one segment, based on at least one of a direction of the estimated normal vector of each point, a location of each point, and a color of each point. For example, the processor 410 may group points having normal vectors in the same or similar directions into one segment.

The processor 410 may determine a representative normal vector for the segment, based on the normal vectors of the points included in the segment.

For example, the processor 410 may determine, as the representative normal vector, an average value of the normal vectors of the plurality of points included in the segment. However, embodiments are not limited thereto, and the processor 410 may determine the representative normal vector by using various methods such as a maximum value, a minimum value, and an intermediate value. A "normal vector of a segment" may refer to a representative normal vector that is representative of the segment.

Next, the processor 410 according to an embodiment may project the plurality of points of the point cloud on a 2D plane. For example, the processor 410 may project the points in units of segments each including grouped points.

In general, when projection is performed on the plurality of points, projection is performed with respect to only three planes such as a first XY plane XY0, a first YZ plane YZ0, and a first XZ plane XZ0, instead of 6 planes such as a first XY plane XY0, a second XY plane XY1, a first YZ plane YZ0, a second YZ plane YZ1, a first XZ plane XZ0, and a second XZ plane XZ1. Projecting points onto only three planes (the XY plane XY0, the YZ plane YZ0, and the XZ plane XZ0) may refer to projecting points onto each of the three planes in a single direction (for example, a +z direction, a +x direction, or a +y direction). According to a general technique of projecting points onto a predetermined plane in only a single direction, as described above with reference to FIG. 3, the information about an outer surface point and the information about an inner point are mixed in the T0 image and the T1 image.

Accordingly, to address this problem, the processor 410 according to an embodiment may generate patches by projecting the points included in the segment onto the predetermined plane in a first direction or a second direction. The first direction and the second direction may be a forward direction and a backward direction with respect to the predetermined plane. For example, the processor 410 may project points onto XY planes (the first XY plane and the second XY plane) in the −z direction or the +z direction.

The processor 410 according to an embodiment may determine a direction where to project the points included in the segment, based on similarity between the representative normal vector of the segment and the normal vectors of the predetermined plane (i.e., a normal vector of the predetermined plane corresponding to the first direction and a normal vector of the predetermined plane corresponding to the second direction).

The processor 410 according to an embodiment may further consider the locations of the points in addition to the similarity between the normal vectors when determining the projection direction. The processor 410 may determine a bounding box that surrounds an object represented by the point cloud. The processor 410 may determine the direction where to project the points included in the segment, based on the locations of points with respect to planes that constitute the bounding box.

The processor 410 according to an embodiment may calculate weights for the XY plane, the YZ plane, and the XZ plane on a 3D space represented by the point cloud, based on the bounding box. The processor 410 may determine a predetermined plane where and a direction in which to project the points included in the segment, based on the similarity between the normal vectors of the XY plane, the YZ plane, and the XZ plane and the representative normal vector and the calculated weights.

A method of determining the projection direction, based on the bounding box, will be described in more detail later with reference to FIG. 7.

The processor 410 according to an embodiment may generate 2D images by packing the patches.

The processor 410 may generate a 2D image by collecting a plurality of projected patch groups. The processor 410 may generate the D0 image by collecting the values of D0, generate the D1 image by collecting the values of D1, generate the T0 image by collecting the values of D0, and generate the T1 image by collecting the values of T1.

Figure 8:
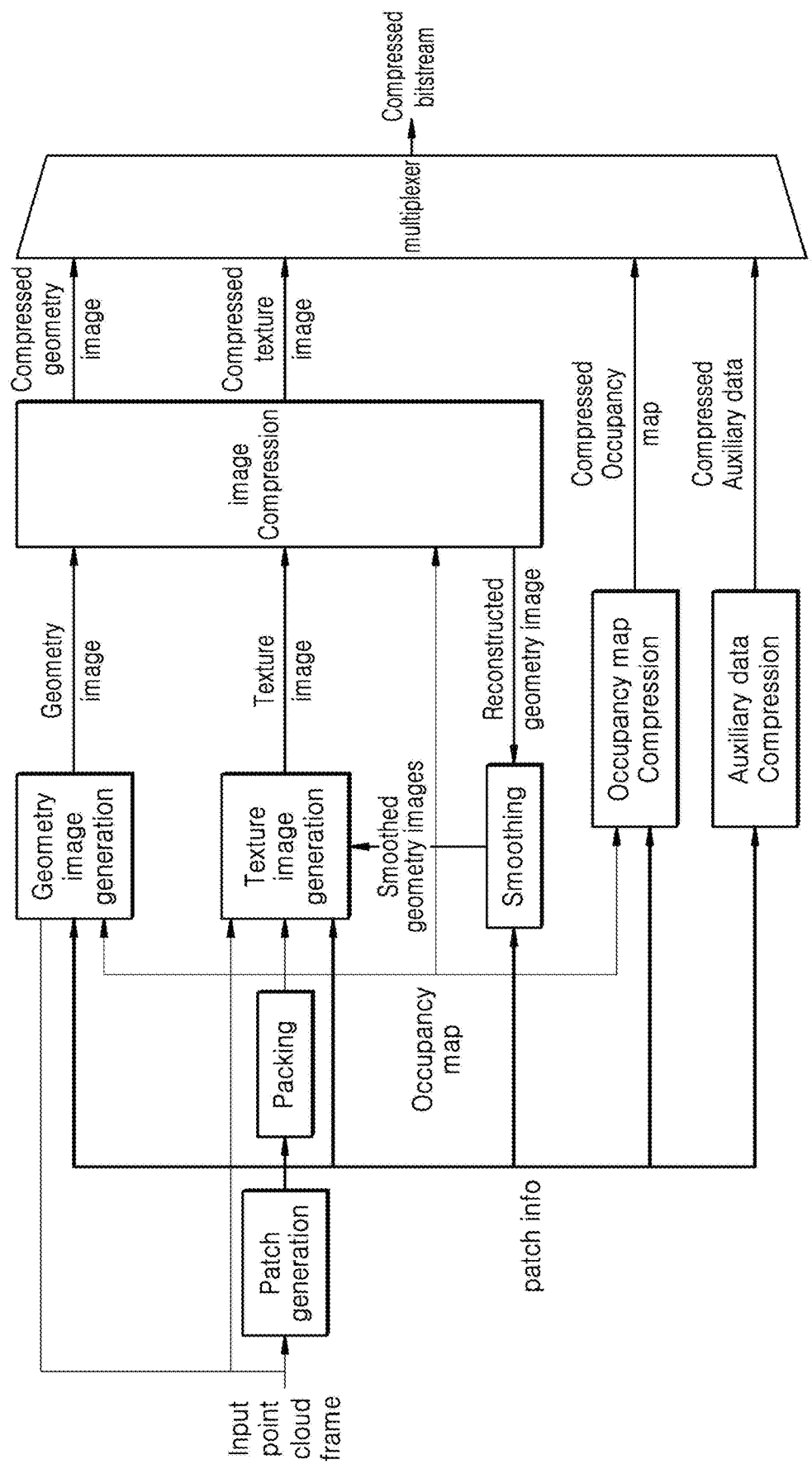
FIG. 8 is a block diagram of a detailed structure of a processor of an image encoding apparatus according to an embodiment.

FIG. 8 is a detailed block diagram of the processor 410 of the image encoding apparatus 400 according to an embodiment. As shown in FIG. 8, the processor 410 according to an embodiment may generate a patch by projecting a plurality of points included in an input point cloud onto a 2D plane. The processor 410 may generate the patch by projecting grouped points onto a plane. The processor 410 may classify patches having high similarity to each other and collect and pack the classified patches, thereby generating a geometry image and a texture image. The geometry image may represent location information of the points included in the point cloud, and the texture image may represent color information of the points.

As shown in FIG. 8, a bitstream including information about one point cloud may include the geometry image (the D0 image and the D1 image), the texture image (the T0 image and the T1 image), an occupancy map, and auxiliary data. When data associated with the point cloud is changed to a 2D image, the occupancy map may include information for distinguishing a pixel having information about the point cloud from a pixel not having the information about the point cloud from among the pixels of the 2D image. The auxiliary data may include patch information.

The processor 410 according to an embodiment may store information about outer surface points in the D0 image and the T0 image, and may store information about inner points in the D1 image and the T1 image. The processor 410 may perform projection so that information about an outer surface and information about an inner surface are separated and stored.

The image encoding apparatus 400 according to an embodiment may include information related to projection in auxiliary data and transmit the information related to projection to the image decoding apparatus, so that the image decoding apparatus may use the information related to projection when reconstructing a point cloud. For example, information about a direction in which a point is projected may be included in the auxiliary data and may be transmitted.

The output interface 420 of the image encoding apparatus 400 may output a compressed bitstream by compressing information about the 3D image data processed by the processor 410.

The output interface 420 according to an embodiment may output a bitstream including information about a direction in which each point is projected to generate patches and information about the 2D image. For example, the output interface 420 of the image encoding apparatus 400 may transmit the bitstream to the image decoding apparatus through a network, or may store the bitstream inside the image encoding apparatus 400 or in an external memory.

A method, performed by the image encoding apparatus 400 according to various embodiments, of encoding a 3D image will now be described in detail with reference to FIG. 5.

Figure 5:
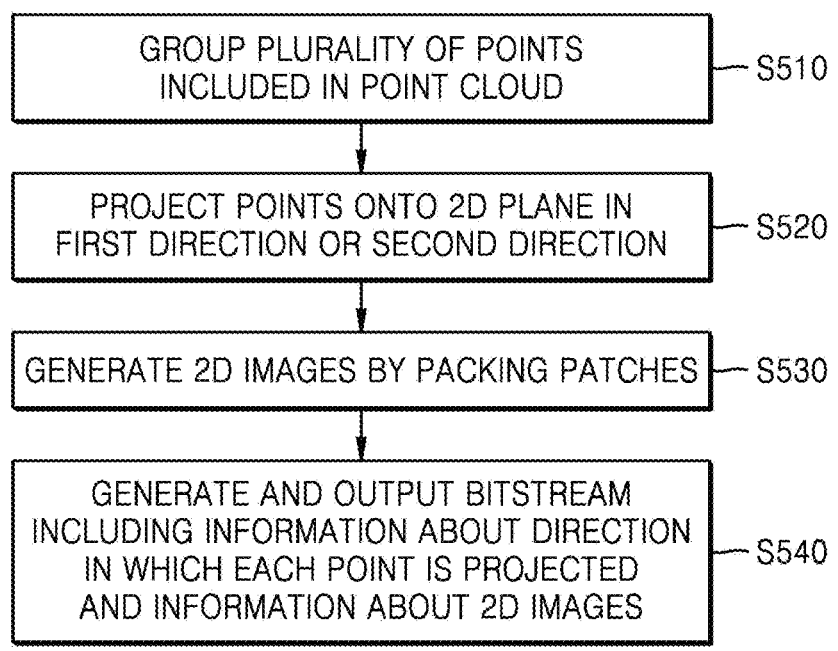
FIG. 5 is a flowchart of a method, performed by an image encoding apparatus according to an embodiment, of encoding a 3D image.

FIG. 5 is a flowchart of a method, performed by the image encoding apparatus 400 according to an embodiment, of encoding a 3D image. Each of the operations of the method to be described below may be performed by each of the components of the image encoding apparatus 400 of FIG. 4. The description given above in relation to the image encoding apparatus 400 is applicable to each of the operations of the method. A repeated description thereof will be omitted.

In operation S510, the image encoding apparatus 400 according to an embodiment may group the plurality of points included in the point cloud into at least one segment.

The image encoding apparatus 400 may estimate a normal vector of each of the plurality of points included in the point cloud, before grouping the plurality of points. The image encoding apparatus 400 may group the plurality of points into at least one segment, based on at least one of a direction of the estimated normal vector of each of the plurality of points, a location of each point, and a color of each point.

For example, the image encoding apparatus 400 may group points having normal vectors in the same or similar directions into one segment. For example, when similarity between the directions of the normal vectors is equal to or greater than a threshold value, the image encoding apparatus 400 may determine that the normal vectors have similar directions.

As another example, the image encoding apparatus 400 may group adjacent points that are apart from each other by a certain value or less into one segment. The image encoding apparatus 400 may consider both the directions of the normal vectors and the distance between the points when constituting the segment.

As another example, the image encoding apparatus 400 may group the points into one segment, based on the colors of the points. For example, the image encoding apparatus 400 may group the points into one segment, when the points have the same or similar colors, even when similarity between the directions of the normal vectors decreases or the distance between the points is equal to or greater than a certain value.

In operation S520, the image encoding apparatus 400 according to an embodiment may project the points onto the 2D plane.

Figure 6:
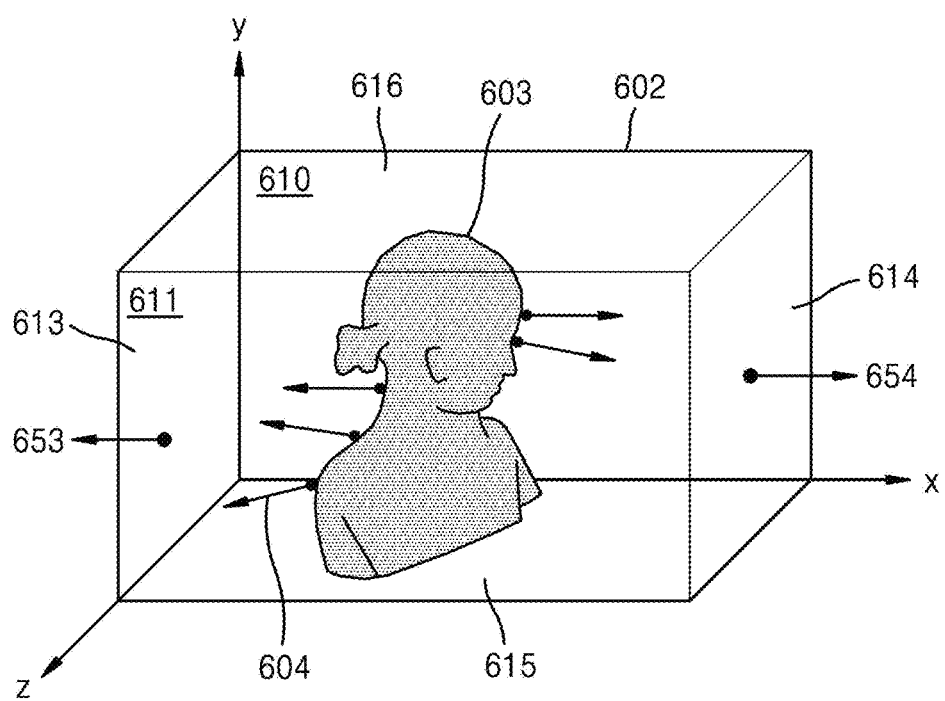
FIG. 6 is a view for explaining a method of estimating the normal vectors of points included in a point cloud and projecting the points onto a 2D plane, based on the estimated normal vectors, according to an embodiment.

Referring to FIG. 6, a plurality of points of an object 603 expressed with a point cloud may be projected onto a plane that constitutes a virtual hexahedral space 602.

To project the plurality of points representing the object 603, the virtual hexahedral space 602 in which the object 603 is located at the center may be assumed. The virtual hexahedral space 602 may include a first XY plane (XY0) 610, a second XY plane (XY1) 611, a first YZ plane (YZ0) 613, a second YZ plane (YZ1) 614, a first XZ plane (XZ0) 615, and a second XZ plane (XZ1) 616.

The normal vector of the first XY plane (XY0) 610 may be the −z direction, and the normal vector of the second XY plane (XY1) 611 may be the +z direction. The normal vector of the first YZ plane (YZ0) 613 may be in the −x direction, and the normal vector of the second YZ plane (YZ1) 614 may be in the +x direction. The normal vector of the first XZ plane (XZ0) 615 may be in the −y direction, and the normal vector of the second XZ plane (XZ1) 616 may be in the +y direction.

In FIG. 6, an arrow 604 represents an estimated normal vector of a certain point included in a point cloud. The normal vector of the first YZ plane (YZ0) 613 is shown as an arrow 653, and the normal vector of the second YZ plane (YZ1) 614 is shown as an arrow 654.

The direction of the estimated normal vector of a point may be the same as or similar to the direction of the normal vector of a plane that constitutes the virtual hexahedral space 602. When similarity between the direction of the estimated normal vector of the point and the direction of the normal vector of the plane that constitutes the virtual hexahedral space 602 is equal to or greater than a threshold value, it may be determined that the direction of the estimated normal vector of the point is similar to the direction of the normal vector of the plane that constitutes the virtual hexahedral space 602. When it is determined that the direction of the estimated normal vector of the point is similar to or equal to the direction of the normal vector of a predetermined plane that constitutes the virtual hexahedral space 602, the image encoding apparatus 400 may project the point onto the predetermined plane in the direction of the normal vector of the predetermined plane.

According to an embodiment, the image encoding apparatus 400 may perform projection of a segment including grouped points onto a plane having a normal vector direction that is the most similar to the normal vector of the segment.

For example, when the image encoding apparatus 400 projects a plurality of points onto planes that constitute a virtual hexahedral space, information about a projection plane including direction information may have six values. The six values may be expressed as {0, 1, 2, 3, 4, 5} and may indicate the following meanings.

0: first XY plane (XY0)
1: first YZ plane (YZ0)
2: first XZ plane (XZ0)
3: second XY plane (XY1)
4: second YZ plane (YZ1)
5: second XZ plane (XZ1)

Planes expressed by 0 and 3 may be equal to each other as XY planes, but 0 has a forward projection direction and 3 has a backward projection direction. Relationships between 1 and 4, between 2 and 5, and between 0 and 3 may be the same as one another.

The image encoding apparatus 400 according to an embodiment may generate patches by projecting the points included in the segment onto the predetermined plane in the first direction or the second direction.

The predetermined plane is one of an XY plane, a YZ plane, and an XZ plane on the 3D space represented by the point cloud, and the first direction and the second direction may be perpendicular to the predetermined plane and may be opposite to each other.

The image encoding apparatus 400 may determine a representative normal vector of the segment, based on the normal vectors of the points included in the segment. The image encoding apparatus 400 may determine a direction in which the points included in the segment are to be projected, based on similarity between the representative normal vector and the normal vectors of the predetermined plane.

When the points are projected in the first direction, the image encoding apparatus 400 may select, as a D0 value, the depth value of a first point that is the smallest, from among the points projected onto the same locations on the predetermined plane. The image encoding apparatus 400 may select, as a D1 value, the depth value of a second point that is the largest, from among the points existing within a predetermined distance from the first point. The first direction may be a forward direction with respect to the predetermined plane.

When the points are projected in the first direction, the image encoding apparatus 400 may include a minimum D0 from among D0 values and D1 values in the auxiliary data and transmit the minimum D0 included in the auxiliary data, and may store a differential value between each D0 value and each D1 value with respect to the minimum D0 as information about the D0 and D1 values in a bitstream.

When the points are projected in the second direction, the image encoding apparatus 400 may select, as a D0 value, the depth value of a third point that is the largest, from among the points projected onto the same locations on the predetermined plane. The image encoding apparatus 400 may select, as a D1 value, the depth value of a fourth point that is the smallest, from among the points existing within a predetermined distance from the third point. The second direction may be a backward direction with respect to the predetermined plane.

When the points are projected in the second direction, the image encoding apparatus 400 may include a maximum D0 from among D0 and D1 values of the segment in the auxiliary data and transmit the maximum D0 included in the auxiliary data, and may store a differential value between each D0 value and each D1 value with respect to the maximum D0 as information about the D0 and D1 values. At this time, information about a plane including direction information may be included in the auxiliary data and may be transmitted.

The image encoding apparatus 400 according to an embodiment may use Syntax 1 below in order to store the information about D0 and D1 values.

Syntax 1

```
for (const auto i : connectedComponent) {
    const PCCVector3D point = points[i];
    const int16_t d = int16_t(round(point[patch.getNormalAxis( )]));
    const size_t u = size_t(round(point[patch.getTangentAxis( )] -
    patch.getU1( )));
    const size_t v = size_t(round(point[patch.getBitangentAxis( )] -
    patch.getV1( )));
    assert(u >= 0 && u < patch.getSizeU( ));
    assert(v >= 0 && v < patch.getSizeV( ));
    const size_t p = v + patch.getSizeU( ) + u;
    if (patch.getViewid( ) <= 2) {
        if (Patch.getDepth(0)(p] > d) {
            patch.getDepth(0)[p] = d;
            patch.getSizeU0( ) = (std::max)(patch.getSizeU0( ),
                u / patch.getOccupancyResolution( ));
            patch.getSizeY0( ) = (std::max)(patch.getSizeV0( ),
                v / patch.getOccupancyResolution( ));
            patch.getD1( ) = (std::min)(patch.getD1( ), size_t(d));
        }
    }
    else {
        if (patch.getDepth(0)[p] < d) {
            patch.getDepth(0)[p] = d;
            patch.getSizeU0( ) = (std::max)(patch.getSizeU0( ),
                u / patch.getOccupancyResolution( ));
            patch.getSizeV0( ) = (std::max)(patch.getSizeV0( ),
                v / patch.getOccupancyResolution( ));
            patch.getD1( ) = (std::max)(patch.getD1( ), size_t(d));
        }
    }
}
```

However, embodiments are not limited thereto, and, when the information about D0 and D1 values is transmitted, not a differential value between the D0 and D1 values for the minimum value or maximum value but the D0 and D1 values may be transmitted.

The image encoding apparatus 400 according to an embodiment may determine a bounding box that surrounds an object represented by the point cloud. The image encoding apparatus 400 may determine a direction where to project the points included in the segment, based on the locations of points included in the segment with respect to planes that constitute the bounding box.

The image encoding apparatus 400 according to an embodiment may use a calculated weight in the bounding box when determining the direction where to project the points included in the segment. The image encoding apparatus 400 may calculate weights for the XY plane, the YZ plane, and the XZ plane on the 3D space represented by the point cloud, based on the bounding box that surrounds the object represented by the point cloud. The image encoding apparatus 400 may determine a predetermined plane where and a direction in which to project the points included in the segment, based on the similarity between the normal vectors of the XY plane, the YZ plane, and the XZ plane and the representative normal vector and the calculated weights.

In operation S530, the image encoding apparatus 400 according to an embodiment may generate 2D images by packing patches.

The image encoding apparatus 400 according to an embodiment may generate a 2D image by collecting a plurality of projected patch groups. The processor 410 may generate the D0 image by collecting the values of D0, generate the D1 image by collecting the values of D1, generate the T0 image by collecting the values of D0, and generate the T1 image by collecting the values of T1. The image encoding apparatus 400 may classify patches having high similarity therebetween and collect and pack the classified patches, thereby generating a geometry image including the D0 image and the D1 image and a texture image including the T0 image and the T1 image.

The image encoding apparatus 400 according to an embodiment may determine a projection direction so that information about an outer surface and information about an inner surface may be separated and stored in each of 'the D0 image and the T0 image' and 'the D1 image and the T1 image', and may perform projection in the determined direction.

The image encoding apparatus 400 according to an embodiment may include information related to projection in the auxiliary data and transmit the information related to projection to the image decoding apparatus, so that the image decoding apparatus may use the information related to projection when reconstructing the point cloud. For example, information about a direction in which a point is projected may be included in the auxiliary data and may be transmitted.

According to an embodiment, each patch may have a dedicated direction that allows patches to be placed outside-in. Accordingly, T0 may include information about the color of an outer surface point, and T1 may include information about the color of an inner surface point.

The image encoding apparatus 400 according to an embodiment may change information (normal Axix) about a projection direction conventionally having a value in a [0, 2] range such that the information (normal Axix) has a [0,5] range. In the conventional art, when projection with respect to the plurality of points is performed, projection is performed only on three planes including the first XY plane XY0, the first YZ plane YZ0, and the first XZ plane XZ0, in a direction of the normal vector of each plane (for example, −z, −x, or −y). However, because the image encoding apparatus 400 according to an embodiment may perform projection with respect to six planes in the direction of the normal vector of each plane, information about the projection direction may be changed to have a range of [0, 5].

As in Table 1, information about the projection direction may be coded with respect to each patch.

TABLE 1

| normalAxis | Binarization |
| --- | --- |
| 0 | 0 |
| 1 | 10 |
| 2 | 110 |
| 3 | 1110 |
| 4 | 11110 |
| 5 | 11111 |

According to an embodiment, information about the outer surface of an object and information about the inner surface thereof may be separated and stored in each of 'the D0 image and the T0 image' and 'the D1 image and the T1 image'. Accordingly, correlation between patch groups included in one 2D image may increase. As a result, compression efficiency may increase when the 2D image is compressed using a 2D image compression codec.

In operation S540, the image encoding apparatus 400 according to an embodiment may generate and output a bitstream including information about a direction in which each point is projected to generate patches and information about 2D images.

A bitstream according to an embodiment may include information about a geometry image, a texture image, an occupancy map, and auxiliary data. The information about the direction in which each point is projected may be included in the auxiliary data.

For example, when the points included in a segment are projected in the first direction, the auxiliary data may include information about minimum D0 from among D0 values selected for the points included in the segment. When the points included in a segment are projected in the second direction, the auxiliary data may include information about maximum D0 from among the D0 values selected for the points included in the segment.

Figure 7:
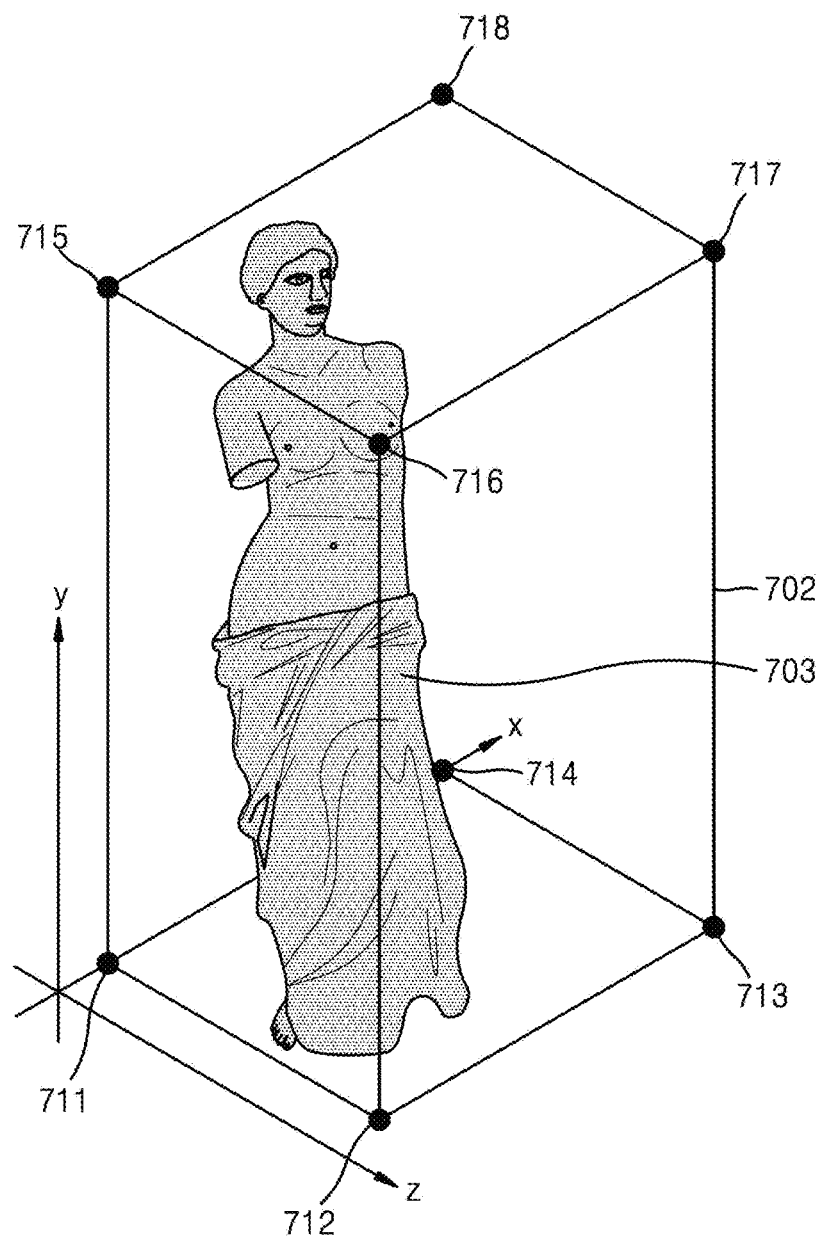
FIG. 7 is a view for explaining a bounding box that surrounds an object represented by a point cloud, according to an embodiment.

FIG. 7 is a view for explaining a bounding box that surrounds an object represented by a point cloud, according to an embodiment.

The image encoding apparatus 400 according to an embodiment may estimate a normal vector of a point or segment, and may determine a projection direction of the point or the points included in the segment, based on the estimated normal vector.

According to an embodiment, the image encoding apparatus 400 may use location information of grouped points in order to select the projection direction of the point. The projection direction of the point may be selected using both the normal vector of the grouped points and location information of the grouped points.

For example, in the case of a point cloud representing an object having a curve such as a wave pattern, an error may be generated when determining a projection plane, based on only the normal vector. To prevent such generation of an error, the image encoding apparatus 400 according to an embodiment may consider the normal vector when determining which one of the XY plane, the YZ plane, and the ZX plane projection is to be performed onto, and may consider the locations of the points constituting the segment when determining a projection direction with respect to the determined plane.

The image encoding apparatus 400 according to an embodiment may determine the projection direction, based on location information, only when similarity between the normal vector of the segment and the normal vector of a plane onto which projection may be performed (for example, the XY plane, the YZ plane, and the ZX plane) is less than or equal to a threshold value. When the similarity is equal to or greater than the threshold value, both the projection plane and the projection direction may be determined using the normal vector.

According to an embodiment, to determine a direction in which a point is to be projected, relative location information of the points about the bounding box may be used.

The bounding box may refer to a rectangular cuboid box determined based on a minimum value and a maximum value for each of coordinates (X,Y,Z) of the points that constitute a point cloud, in order to determine a maximum size that is projected, when 3D point cloud data is projected on a 2D plane.

The bounding box corresponding to a human-shape object shown in FIG. 7 may be a rectangular cuboid expressed with the coordinates of eight points below. The bounding box corresponding to the human-shape object shown in FIG. 7 may be a rectangular cuboid including, as vertexes, the points corresponding to the eight coordinates below.

A point 711: (Minimum X, Minimum Y, Minimum Z)
A point 715: (Minimum X, Maximum Y, Minimum Z)
A point 712: (Minimum X, Minimum Y, Maximum Z)
A point 716: (Minimum X, Maximum Y, Maximum Z)
A point 714: (Maximum X, Minimum Y, Minimum Z)
A point 718: (Maximum X, Maximum Y, Minimum Z)
A point 713: (Maximum X, Minimum Y, Maximum Z)
A point 717: (Maximum X, Maximum Y, Maximum Z)

A case where a normal vector of #0 group including a plurality of points is (0, 0, −1) and the points constituting #0 group are located in an upper side on a Z axis within the bounding box (i.e., a side closer to Maximum Z than to Minimum Z) will be illustrated and described.

When only the normal vector of the segment is considered when determining a projection direction, the image encoding apparatus 400 according to an embodiment may project the points of #0 group onto the first XY plane XY0 in the direction of the normal vector (0,0,−1), because the normal vector of the first XY plane XY0 is (0,0,−1).

However, when the locations of the points are also considered when determining the projection direction, the image encoding apparatus 400 according to an embodiment may determine that the points are projected onto the XY plane, based on the normal vector of #0 group. Because the Z-axis values of the points constituting #0 group are located on the upper side within the bounding box, the image encoding apparatus 400 may determine that the points of #0 group are projected onto the second XY plane XY1 in the direction of the normal vector (0,0,1). When the Z-axis values of the points constituting #0 group are located on the lower side within the bounding box (i.e., a side closer to Minimum Z than to Maximum Z), the image encoding apparatus 400 may determine that the points are projected onto the first XY plane XY0 in the direction of the normal vector (0,0,−1). When a direction in which a point is projected is determined using the location of the point, various methods using values such as the average values/minimum values/maximum values/middle values of values that represent the location of the point may be used.

According to another embodiment, the image encoding apparatus 400 may calculate similarity between the value of an estimated normal vector of each point and normal vector values of candidate projection planes, and may project each point onto a plane having largest similarity. The candidate projection planes are six planes onto which a point may be projected, and thus may include the first XY plane (XY0), the second XY plane (XY1), the first YZ plane (YZ0), the second YZ plane (YZ1), the first XZ plane (XZ0), and the second XZ plane (XZ1) that constitute a virtual hexahedral space.

The image encoding apparatus 400 may calculate similarity between the value of the estimated normal vector of each point and the values of normal vectors of the candidate projection planes according to Syntax 2, and may determine a plane having largest similarity as a projection plane.

$$\text{for}(i = 0; i < 6; i++) \quad\quad \text{Syntax 2}$$
$$\{score(i) = dot(normal\_vector, projection\_vector(i));\}$$
$$\max_i \{Score(i)\}$$
$$Projection\_plane = Plane(i);$$

When the value of the estimated normal vector of each point is similar to the values of the normal vectors of different candidate projection planes, a plane onto which a point is to be projected may be determined according to a difference of a very small value. This ambiguity may cause degradation of compression performance.

The image encoding apparatus 400 according to an embodiment may use a weight when calculating similarity between the value of a normal vector of a point or a point group and the normal vectors of the candidate projection planes, in order to prevent degradation of compression performance. The image encoding apparatus 400 may apply a weight (weight(i)) when calculating the similarity between the value of the estimated normal vector of each point and the values of the normal vectors of the candidate projection planes according to Syntax 3.

$$\text{for}(i = 0; i < 6; i++) \quad\quad \text{Syntax 3}$$
$$\{score(i) =$$
$$weight(i) * dot(normal\_vector, projection\_vector(i));\}$$
$$\max_i \{Score(i)\}$$
$$Projection\_plane = Plane(i);$$

The weight used in Syntax 3 may be a weight for each of the candidate projection planes. The weight may be determined based on the bounding box.

For example, a weight (XY_plane_weight) for the XY plane of the bounding box of FIG. 7 may be calculated as below.

Max_value=Max{ {Maximum X−Minimum X}*{Maximum Y−Minimum Y}, {Maximum X−Minimum X}*{Maximum Z−Minimum Z}, {Maximum Y−Minimum Y}*{Maximum Z−Minimum Z} }

XY_plane_weight={Maximum X−Minimum X}*{Maximum Y−Minimum Y}/Max_value

As another example, the image encoding apparatus 400 according to an embodiment may project all points within a single point cloud frame onto the planes that constitute the bounding box, and may generate a weight, based on the number of points projected onto each plane.

As another example, when calculating the similarity between the value of the normal vector of a point or a point group and the normal vectors of the candidate projection planes, the image encoding apparatus 400 according to an embodiment may perform the calculation by adding weights, according to Syntax 4 below. A and B used herein are arbitrarily designated constants.

$$\text{for}(i = 0; i < 6; i++)$$  Syntax 4

$$\{\text{score}(i) = A * \text{dot}(\text{normal\_vector, projection\_vector}(i)) +$$

$$B * \text{weight}(i);\}$$

$$A, B, \in \{x \,|\, x \text{ is a real number between 0 and 1}\}$$

$$\max_i \{\text{Score}(i)\}$$

$$\text{Projection\_plane} = \text{Plane}(i);$$

FIG. 8 is a block diagram of a detailed structure of a processor of an image encoding apparatus according to an embodiment.

The blocks shown in FIG. 8 may be all hardware components, or may be functional blocks corresponding to some functions executed by the processor 410 of FIG. 4. Thus, respective operations of components that will be described later may be performed by the processor 410.

A patch generation unit of FIG. 8 may generate a patch by projecting a plurality of points included in an input point cloud onto a 2D plane. The plurality of points included in the 3D point cloud may be grouped based on at least one of a direction of the normal vector of each point, a location of each point, and a color of each point. The patch generation unit may generate the patch by projecting the grouped points onto a plane.

A packing unit may classify patches that are highly similar to one another, and collect and pack the classified patches. A geometry image generation unit may generate a D0 image and a D1 image representing location information of the points included in the point cloud. A texture image generation unit may generate a T0 image and a T1 image representing color information of the points. A smoothing unit may perform correction such that points of which location information has been reconstructed form a plane, by applying a smoothing algorithm to a reconstructed geometry image.

When the point cloud represents information about an object, information about an externally exposed surface of the object may be important, and information about the inside of the object may be relatively less important. Accordingly, the patch generation unit of FIG. 8 may project only the points located near the surface of the object onto a plane when projecting the point cloud.

The processor 410 may use a predetermined surface thickness value to project the point cloud. The processor 410 may perform projection with respect to only points having depth values existing within the predetermined surface thickness value from the surface. The processor 410 may generate the D0 image (location information image) by projecting a point located on the surface of the object represented by the point cloud. The processor 410 may generate the D0 image (location information image) by collecting patches representing the depth value of the point located on the surface of the object. The processor 410 may generate the D1 image (thickness information image) by projecting points existing within the predetermined surface thickness value from the surface. The processor 410 may generate the D1 image (thickness information image) by collecting patches representing the depth values of the points.

The processor 410 may collect color information associated with an outer surface point of the object represented by the point cloud and store the collected color information as the T0 image, and may collect color information associated with an inner surface point of the object and store the collected color information as the T1 image.

An image compression unit may compress geometry images and text images by using a 2D image compression technique. An occupancy map compression unit and an auxiliary data compression unit may compress an occupancy map and auxiliary data, respectively.

A multiplexer may output a bitstream including the compressed geometry image, the compressed texture image, the compressed occupancy map, and the compressed auxiliary data. The processor 410 according to an embodiment may generate and output a bitstream including information about a direction in which a point is projected. The information about the projection direction may be included in the auxiliary data.

Image data generated and output by the image encoding apparatus 400 according to an embodiment may be transmitted to an image decoding apparatus 900 according to an embodiment. A structure and operation of the image decoding apparatus according to an embodiment will now be described with reference to FIG. 9. The image decoding apparatus 900 according to an embodiment may reconstruct a 3D point cloud, based on received image data. For example, the image decoding apparatus 900 may be connected to an image encoding apparatus through a network, and may receive compressed and encoded image data from the image encoding apparatus.

The image decoding apparatus 900 according to an embodiment may include a receiver 910 and a processor 920. Although the image decoding apparatus 900 includes a single processor 920 in FIG. 9, the image decoding apparatus 900 may include a plurality of processors, and a function and an operation of the processor 920, which will be described below, may be performed by the plurality of processors.

Figure 9:
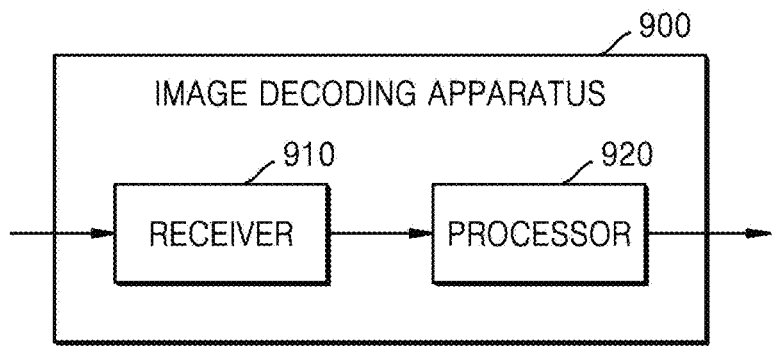
FIG. 9 is a block diagram of an image decoding apparatus according to an embodiment.

Although not shown in FIG. 9, the image decoding apparatus 900 according to an embodiment may further include a memory. The entirety or a portion of data about a point cloud processed by the image decoding apparatus 900 may be temporarily or semi-permanently stored in the memory. The entirety or a portion of an algorithm about image processing methods performed by the image decoding apparatus 900 may be temporarily or semi-permanently stored in the memory. However, the memory, the receiver 910, and the processor 920 do not necessarily have to be implemented as separate devices, but may be implemented as a single component having the same form as a single chip.

The receiver 910 of the image decoding apparatus 900 according to an embodiment may receive a bitstream, and the processor 920 may process the bitstream.

The processor 920 may reconstruct a point cloud, based on the received bitstream. The image decoding apparatus 900 may output the reconstructed point cloud, or may output a 3D image, based on the point cloud. For example, the image decoding apparatus 900 may display the 3D image on a display.

The processor 920 of the image decoding apparatus 900 according to an embodiment may obtain a location information image, a color information image, and projection direction information from the bitstream. The color information image may be a texture image, and the location information image may be a geometry image. The processor 920 may reconstruct location information of points, based on the geometry image and the projection direction information. The projection direction information may include information about a direction in which the points included in the point cloud have been projected onto a predetermined plane, from among the first direction and the second direction, to generate the geometry image. The processor 920 may reconstruct the point cloud by reconstructing color information of points of which location information has been reconstructed, based on the texture image.

A method, performed by the image decoding apparatus 900 according to various embodiments, of decoding the 3D image will now be described with reference to FIG. 10.

Figure 10:
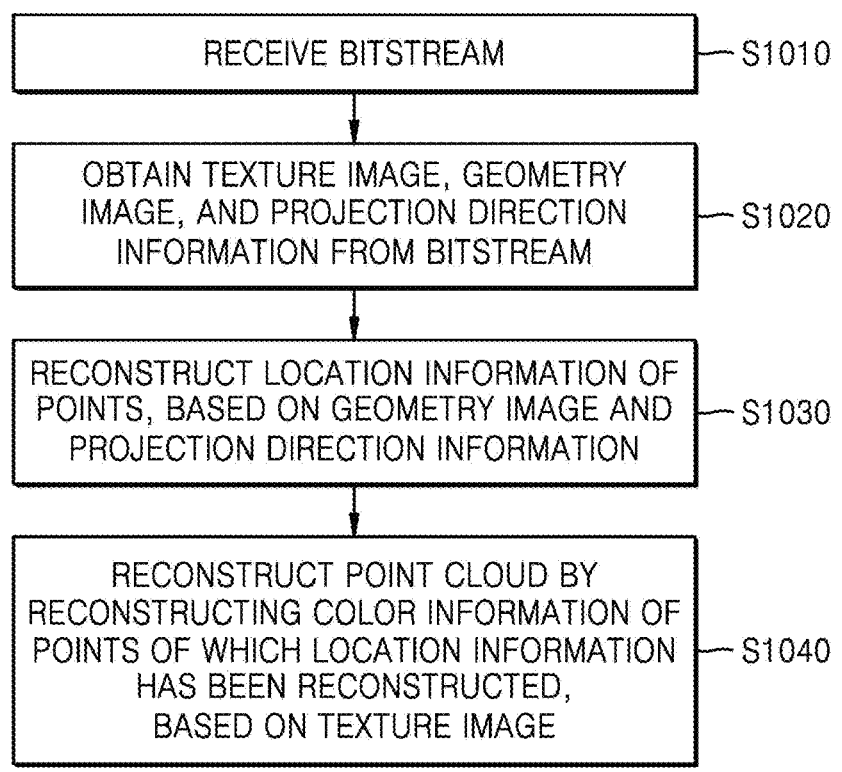
FIG. 10 is a flowchart of a method, performed by an image decoding apparatus according to an embodiment, of decoding a 3D image.

FIG. 10 is a flowchart of a method, performed by the image encoding apparatus 900, of decoding a 3D image, according to an embodiment. Each operation of the method to be described below may be performed by each of the components of the image decoding apparatus 900 of FIG. 9. The description given above in relation to the image decoding apparatus 900 is applicable to each of the operations of the methods below. A repeated description thereof will be omitted.

In operation S1010, the image decoding apparatus 900 according to an embodiment may receive a bitstream. The bitstream received by the image decoding apparatus 900 may be the bitstream generated and output by the image encoding apparatus 400 according to an embodiment.

In operation S1020, the image decoding apparatus 900 according to an embodiment may obtain a texture image, a geometry image, and projection direction information from the bitstream. The image decoding apparatus 900 may extract the texture image, the geometry image, the occupancy map, and the auxiliary data from the bitstream, and may obtain the projection direction information from the auxiliary data.

In operation S1030, the image decoding apparatus 900 according to an embodiment may reconstruct location information of points, based on the geometry image and the projection direction information. The occupancy map may be further used to reconstruct the location information of the points.

The projection direction information according to an embodiment may include information about a direction in which the points included in the point cloud have been projected on a predetermined plane, from among the first direction and the second direction, to generate the geometry image. The first direction may be a forward direction with respect to the predetermined plane, and the second direction may be a backward direction with respect to the predetermined plane.

The image decoding apparatus 900 according to an embodiment may determine whether information transmitted as the auxiliary data is a minimum D0 value or a maximum D0 value, based on the projection direction information, and may reconstruct the location information of the points, based on a result of the determination.

When the points are projected in the first direction, the image decoding apparatus 900 according to an embodiment may reconstruct the location information of the points by adding D0 and D1 values obtained from the geometry image to the minimum D0 value.

When the points are projected in the second direction, the image decoding apparatus 900 according to an embodiment may reconstruct the location information of the points by subtracting the D0 and D1 values obtained from the geometry image from the maximum D0 value. When a result of subtracting the D0 and D1 values from the maximum D0 value is less than 0, the image decoding apparatus 900 may correct a result value to 0.

The image decoding apparatus 900 according to an embodiment may use Syntax 5 below in order to reconstruct the location information.

Syntax 5

```
If (patch.getNormalAxis( ) <= 2) {
    point1[patch.getNormalAxis( )] = double(frame1.getValue(0,
    x, y) + patch.getD1( ));
}
else {
    double tmp_depth = double(patch.getD1( )) -
    double(frame1.getValue(0, x, y));
    if (tmp_depth < 0) {
        point1[patch.getNormalAxis( ) -3 ] = 0;
    }
    else {
        point1[patch.getNormalAxis( ) -3 ] = tmp_depth;
    }
}
```

However, embodiments are not limited thereto, and not a differential value between the D0 and D1 values for the minimum value or maximum value but the D0 and D1 values may be received and used to reconstruct the point cloud.

In operation S1040, the image decoding apparatus 900 according to an embodiment may reconstruct the point cloud by reconstructing color information of points of which location information has been reconstructed in operation S1030, based on the texture image. The occupancy map may be further used to reconstruct the color information of the points.

FIG. 11 is a block diagram of a detailed structure of a processor of an image decoding apparatus according to an embodiment.

The blocks shown in FIG. 11 may be all hardware components, or may be functional blocks corresponding to some functions executed by the processor 920 of FIG. 9. Thus, respective operations of components that will be described later may be performed by the processor 920.

In response to a bitstream, a de-multiplexer may obtain a compressed texture image, a compressed geometry image, a compressed occupancy map, and compressed auxiliary data from the bitstream. An image decompression unit may decompress compressed pieces of information.

A geometry reconstruction unit may reconstruct location information of points, based on a geometry image, an occupancy map, and auxiliary data including projection direction information. A smoothing unit may perform correction such that points of which location information has been reconstructed form a plane, by applying a smoothing algorithm to the reconstructed location information. A texture reconstruction unit may reconstruct color information of the points, based on the geometry image and the location information. The processor 920 may output a reconstructed point cloud.

The disclosed embodiments may be implemented as an S/W program including instructions stored in computer-readable storage media.

A computer is a device capable of calling stored instructions from a storage medium and operating according to the disclosed embodiments according to the called instructions, and may include the image transmission devices and the image reception devices according to the disclosed embodiments.

The computer-readable storage medium may be provided as a non-transitory storage medium. Here, 'non-transitory' means that the storage medium does not include a signal and is tangible, but does not include distinguish whether data is stored semi-permanently or temporarily in the storage medium.

Also, electronic devices or methods according to the disclosed embodiments may be provided in a computer program product. The computer program product may be traded as a commodity between a seller and a purchaser.

The computer program product may include a software program and a computer-readable storage medium having the software program stored thereon. For example, the computer program product may include a product in the form of a software program (e.g., a downloadable app) that is electronically distributed through the manufacturer of an electronic device or an electronic market (e.g., Google Play Store, AppStore). For electronic distribution, at least a portion of the software program may be stored on a storage medium or may be created temporarily. In this case, the storage medium may be a server of a manufacturer, a server of an electronic market, or a storage medium of a relay server for temporarily storing an SW program.

The computer program product may include a storage medium of a server or a storage medium of a terminal in a system composed of a server and a terminal (e.g., an image transmission device or an image reception device). Alternatively, if there is a third device (e.g., a smartphone) in communication with the server or terminal, the computer program product may include a storage medium of the third device. Alternatively, the computer program product may include the S/W program itself transmitted from the server to the terminal or the third device, or transmitted from the third device to the terminal.

In this case, one of the server, the terminal, and the third device may execute the computer program product to perform the methods according to the disclosed embodiments. Alternatively, at least two of the server, the terminal, and the third device may execute the computer program product to distribute and perform the methods according to the disclosed embodiments.

For example, a server (e.g., a cloud server or an AI server) may execute a computer program product stored on a server to control a terminal communicating with the server to perform the methods according to the disclosed embodiments.

As another example, a third device may execute a computer program product to control a terminal in communication with the third device to perform the methods according to the disclosed embodiments. For example, the third device may remotely control an image transmission device or an image reception device to transmit or receive a packing image.

When the third device executes the computer program product, the third device may download the computer program product from the server and execute the downloaded computer program product. Alternatively, the third device may execute a computer program product provided in a preloaded state to perform methods according to the disclosed embodiments.

The invention claimed is:

1. A method of encoding a three-dimensional (3D) image including a point cloud frame, the method comprising:

grouping a plurality of points included in the point cloud frame into at least one segment;

determining a direction in which points included in a segment are to be projected onto a predetermined plane from among a first direction or a second direction based on locations of the points with respect to planes that constitute a bounding box, the first direction and the second direction being perpendicular to the predetermined plane and opposite to each other;

generating a patch by projecting the points included in the segment onto the predetermined plane in the determined direction;

generating two-dimensional (2D) images by packing the patch; and generating and outputting a bitstream including information about the determined direction and information about the 2D images, wherein, in response to each point being projected in the first direction, the bitstream comprises information about a minimum value among values selected for the points included in the segment, and, in response to each point being projected in the second direction, the bitstream comprises information about a maximum value from among the values selected for the points included in the segment.

2. The method of claim 1, further comprising:

estimating a normal vector of each point of the plurality of points included in the point cloud frame, wherein the grouping comprises grouping the plurality of points into the at least one segment based on at least one of a direction of the normal vector of each point included in the point cloud frame, a location of each point included in the point cloud frame, and a color of each point included in the point cloud frame.

3. The method of claim 2, further comprising:

determining a representative normal vector for the segment, based on the normal vectors of the points included in the segment, wherein the determining of the direction comprises determining the direction in which the points included in the segment are to be projected, based on a similarity between the representative normal vector and normal vectors of the predetermined plane.

4. The method of claim 1, wherein the planes that constitute the bounding box comprises an XY plane, a YZ plane, or an XZ plane on a 3D space represented by the point cloud frame.

5. The method of claim 1, wherein the generating of the patch by projecting the points comprises:

in response to the points being projected in the first direction, selecting, as a D0 value, a depth value of a first point that has a smallest depth value, from among points projected on a same location on the predetermined plane, and selecting, as a D1 value, a depth value of a second point that has a largest depth value from among points existing within a pre-determined distance from the first point; and in response to the points being projected in the second direction, selecting, as the D0 value, a depth value of a third point that has a largest depth value from among points projected on the same location on the predetermined plane, and selecting, as the D1 value, a depth value of a fourth point that has a smallest depth value from among the points existing within the pre-determined distance from the third point.

6. The method of claim 1,
wherein the bitstream includes information about a geometry frame, a color frame, an occupancy map, and auxiliary data,
wherein the information about the direction in which each point is projected is included in the auxiliary data,
wherein, in response to each point being projected in the first direction, the auxiliary data comprises information about a minimum D0 value from among D0 values selected for the points included in the segment, and
wherein, in response to each point being projected in the second direction, the auxiliary data comprises information about a maximum D0 value from among the D0 values selected for the points included in the segment.

7. The method of claim 1, further comprising:
determining the bounding box surrounding an object represented by the point cloud frame.

8. The method of claim 3, wherein the determining of the direction in which the points included in the segment are to be projected comprises:
calculating weights for an XY plane, a YZ plane, and an XZ plane on a 3D space represented by the point cloud frame, based on the bounding box that surrounds an object represented by the point cloud frame; and
determining the predetermined plane and the direction where to project the points included in the segment, based on the similarity between the normal vectors of the XY plane, the YZ plane, and the XZ plane and the representative normal vector and the calculated weights.

9. A three-dimensional (3D) point cloud frame encoding apparatus comprising:
at least one processor configured to:
group a plurality of points included in a point cloud frame into at least one segment,
determine a direction in which points included in a segment are to be projected onto a predetermined plane from among a first direction or a second direction based on locations of the points with respect to planes that constitute a bounding box, the first direction and the second direction being perpendicular to the predetermined plane and opposite to each other,
generate a patch by projecting the points included in the segment onto the predetermined plane in the determined direction, and
generate two-dimensional (213) images by packing the patch; and
an output interface configured to generate and output a bitstream including information about the determined direction and information about the 2D images,
wherein, in response to each point being projected in the first direction, the bitstream comprises information about a minimum value among values selected for the points included in the segment, and, in response to each point being projected in the second direction, the bitstream comprises information about a maximum value from among the values selected for the points included in the segment.

10. The 3D point cloud frame encoding apparatus of claim 9, wherein the at least one processor is further configured to:
estimate a normal vector of each point of the plurality of points included in the point cloud frame,
group the plurality of points into the segment, based on at least one of a direction of the estimated normal vector of each point, a location of each point, and a color of each point,
determine a representative normal vector for the segment, based on the normal vectors of the points included in the segment, and
determine the direction in which the points included in the segment are to be projected, based on a similarity between the representative normal vector and normal vectors of the predetermined plane.

11. The 3D point cloud frame encoding apparatus of claim 10, wherein the at least one processor is further configured to:
calculate weights for an XY plane, a YZ plane, and an XZ plane on a 3D space represented by the point cloud frame, based on the bounding box that surrounds an object represented by the point cloud frame, and
determine the predetermined plane and the direction in which to project the points included in the segment, based on the similarity between the normal vectors of the XY plane, the YZ plane, and the XZ plane and the representative normal vector and the calculated weights.

12. A three-dimensional (3D) point cloud frame decoding method comprising:
receiving a bitstream;
obtaining a color frame, a geometry frame, and projection direction information from the bitstream;
reconstructing location information of points, based on the geometry frame and the projection direction information; and
reconstructing a point cloud frame by reconstructing color information of points of which location information has been reconstructed, based on the color frame,
wherein the projection direction information comprises information about a direction in which points included in the point cloud frame have been projected onto a predetermined plane from among a first direction or a second direction based on locations of the points with respect to planes that constitute a bounding box, the first direction and the second direction being perpendicular to the predetermined plane and opposite to each other, to generate the geometry frame, and
wherein the reconstructing of the location information of the points comprises:
in response to each point being projected in the first direction, reconstructing the location information of the points by adding values obtained from the geometry frame to a reference value; and
in response to each point being projected in the second direction, reconstructing the location information of the points by subtracting values obtained from the geometry frame from the reference value.

13. The 3D point cloud frame decoding method of claim 12, wherein the reconstructing of the location information of the points comprises:
in response to each point being projected in the first direction, reconstructing the location information of the points by adding D0 and D1 values obtained from the geometry frame to a minimum D0 value; and
in response to each point being projected in the second direction, reconstructing the location information of the points by subtracting the D0 and D1 values obtained from the geometry frame from a maximum D0 value.

14. A three-dimensional (3D) point cloud frame decoding apparatus comprising:
a receiver configured to receive a bitstream; and
at least one processor configured to:
reconstruct a point cloud frame by obtaining a color frame, a geometry frame, and projection direction information from the bitstream, reconstructing location information of points, based on the geometry frame and the projection direction information, and reconstructing color information of points of which location information has been reconstructed, wherein the projection direction information comprises information about a direction in which the points included in the point cloud frame have been projected onto a predetermined plane from among a first direction or a second direction based on locations of the points with respect to planes that constitute a bounding box, the first direction and the second direction being perpendicular to the predetermined plane and opposite to each other, to generate the geometry frame, and wherein the at least one processor is further configured to:
  in response to each point being projected in the first direction, reconstruct the location information of the points by adding values obtained from the geometry frame to a reference value; and
  in response to each point being projected in the second direction, reconstruct the location information of the points by subtracting values obtained from the geometry frame from the reference value.

\* \* \* \* \*